United States Patent [19]

Iwanaga

[11] Patent Number: 5,079,661
[45] Date of Patent: Jan. 7, 1992

[54] MAGNETIC HEAD ASSEMBLY HAVING CONSISTENT TRACK PITCH

[75] Inventor: Atsushi Iwanaga, Furukawa, Japan
[73] Assignee: Alps Electric Co., Ltd., Tokyo, Japan
[21] Appl. No.: 627,625
[22] Filed: Dec. 12, 1990

Related U.S. Application Data

[63] Continuation of Ser. No. 325,582, Mar. 17, 1989, abandoned.

[30] Foreign Application Priority Data

Jul. 21, 1988 [JP] Japan .............................. 63-95637[U]

[51] Int. Cl.⁵ .................. G11B 5/55; G11B 21/08; G11B 5/56; G11B 21/24
[52] U.S. Cl. ......................................... 360/106; 360/109
[58] Field of Search ............................... 360/105-106, 360/109

[56] References Cited

U.S. PATENT DOCUMENTS 4,573,093  2/1986  Obama et al.
4,722,012  1/1988  Toldi ................................. 360/106 X
4,766,509  8/1988  Moribe .............................. 360/109 X
4,901,176  2/1990  Kuzuhara ......................... 360/109 X Primary Examiner—A. J. Heinz
Attorney, Agent, or Firm—Guy W. Shoup; B. Noël Kivlin

[57] ABSTRACT

An improved magnetic head assembly is provided by the invention, wherein the upper head device is biased toward the lower head device by a bias means while the lowest position of the upper head device where it comes closest to the lower head device is strictly defined by a stopper means whose position is changeable so that a correct gap is realized between the two head devices. Consequently, even if the upper head device is subjected to adjustment operations to align the upper head to a track while it is under pressure, the upper head device is completely free from any displacement after the adjustment operations and variations of in tracking due to variations in the pressure applied to the magnetic disc by the upper head device.

8 Claims, 3 Drawing Sheets

MAGNETIC HEAD ASSEMBLY HAVING CONSISTENT TRACK PITCH

This application is a continuation of application Ser. No. 07/325,582, filed Mar. 17, 1989, now abandoned.

BACKGROUND OF THE INVENTION

1. Field of the Invention

This invention relates to a magnetic head assembly to be used with a magnetic disc drive device for writing and reading data to and from both sides of a flexible magnetic disc such as so called a floppy disc.

2. Prior Art

External data storage devices using flexible magnetic discs such as so called floppy discs as recording media are widely used for data processing equipments including word processors and personal computers. Recently magnetic discs whose both sides can be used for storing data have become popular.

FIG. 5 of the accompanying drawings shows the configuration of a typical drive device that can be used with two-sides recording magnetic discs. As shown in FIG. 5, the device comprises a magnetic head assembly 101, which further comprises magnetic head carriage 102 and an arm, said magnetic head assembly 101 being moved radially to the two sided recording magnetic disc 105 being used along a guide shaft 104 by a pulse motor which is not shown.

Said magnetic head carriage 102 is made of electrically non-conductive synthetic resin and provided with a magnetic head fitting member 102a at its front end and a support member 102b projecting upward magnetic head fitting member 102a provided at its rear end. In FIG. 5, reference numeral 107 denotes a lower magnetic head 107 which is fitted to said magnetic head fitting member 102a by way of a mold case 108. Reference numeral 109 denotes a lead wire extending from said lower magnetic head 107, said lead wire 109 being connected with another lead wire 111 for external connection via a junction terminal 110.

An arm 103 is realized by molding electrically non-conductive synthetic resin in the form of a plate which is shorter than the magnetic head carriage 102 and comprises a portion of a leaf hinge spring 112 which is integrally buried therein. The arm 103 is swingably fitted to said magnetic head carriage 102 by screwing the tip of said leaf hinge spring 112 to said support member 102b. In FIG. 5, reference numeral 113 denotes a screw for screwing said leaf hinge spring 112 and reference numeral 115 a spacer while reference numeral 116 denotes a metal fixture.

Reference numeral 117 denotes a upper magnetic head which is fitted to a gimbals spring 118 which is securely fitted to the arm 103 so that it faces vis-a-vis the lower magnetic head 107 mounted on said magnetic head carriage 102. Reference numeral 119 denotes a pivot that comes to be engaged with said gimbals spring 118 from behind and reference numeral 120 denotes a lead wire extending from said upper magnetic head 117 and connected with a lead wire 122 for external connection by way of a flexible print substrate 121. Reference numeral 123 denotes a pusher spring provided between said metal fixture 116 and the arm 103 to elastically and constantly bias said arm 103 toward the magnetic head carriage 102 so that the magnetic disc 105 is held by said upper magnetic head 107 and lower magnetic head 117 from both sides.

With a magnetic head assembly 101 which is configured as described above, if it is not loaded with a magnetic disc, the arm 103 is moved upward by a lifting mechanism which is not shown and held at a position which it reaches when it is pivoted around the leaf hinge spring 112 in the direction indicated by arrow F so that the upper magnetic head 117 is separated from the lower magnetic head 107 by a predetermined distance.

On the other hand, when a magnetic disc 105 is loaded between the upper magnetic head 117 and the lower magnetic head 107 and clamped there, consequently the arm 103 is released from the lifted and held condition and pushed downward by the resilient force of the pusher spring 123. The magnetic disc 105 is held by the upper magnetic head 117 and the lower magnetic head 107 on both sides and becomes ready for recording and reading data to and from the magnetic disc 105.

PROBLEMS TO BE SOLVED BY THE INVENTION

In order to ensure stable recording and reading operations with a magnetic head assembly of this type, it may be needless to say that the pressure applied to a magnetic disc 105 by the upper magnetic head 117 and the lower magnetic head 107 to hold the magnetic head 105 has to be maintained at a constant level.

However, with a magnetic head assembly 101 of the prior art as described above, since the arm 103 is held only by the leaf hinge spring 112 at its one end, if the magnetic head assembly 101 is subjected to a force of vibration or shock, the vertical element of the force (along line Z—Z in FIG. 5) effects a large moment of inertia to the arm 103 with its fulcrum located at the leaf hinge spring 112 so that the pressure applied to the magnetic disc 105 by the upper magnetic head 107 and the lower magnetic head 117 can significantly fluctuate.

If the upward inertia of the arm 103 is greater than the pressure applied to the magnetic disc 105 by the upper magnetic head 117 and the lower magnetic head 107, the magnetic disc 105 separates from the magnetic heads 107 and 117 which interferes with the recording or reading operation which is going on. Moreover, if the pressure applied to the magnetic disc 105 by the upper magnetic head 117 and the lower magnetic head 107 fluctuates for any reason, the recording or reading operation at hand will be adversely affected as the magnetic disc 105 can vibrate in the direction of rotation or rotate at varied speeds because of a variation in the friction between the magnetic disc 105 and the magnetic heads 107 and 117 even when the heads are securely pressed against the disc.

With a view to eliminate these problems, the applicant of the present invention has proposed in the Japanese Patent Application No. 62-62559 a magnetic head assembly that operates stably for data recording and reading even when it is subjected to a vibration or shock force. This proposed magnetic head assembly comprises an arm which is provided to support an upper head device and other upper members in such a manner that it can swingably move relative to a magnetic head carriage, that its fulcrum of swinging movement of the arm is positioned approximately at its middle point, a balancer is provided on the arm at a position nearer to the rear end than the fulcrum in order to balance the front and rear portions of the arm and a biasing means such as a spring is provided to maintain the pressure applied to the magnetic disc by the magnetic head assembly.

With a magnetic head assembly having an arrangement as described above, the vibration of the arm caused by an external force can be minimized, however, the assembly is accompanied by certain drawbacks.

More specifically with such a magnetic head assembly, the upper and lower magnetic heads have to be so arranged that a gap which is equal to the width of four or eight tracks is accurately provided therebetween. When the two heads are assembled, the upper magnetic head is correctly positioned by moving it relative to the lower magnetic head and utilizing positioning bores prepared on the upper magnetic head. Now, during the operation of the positioning, the upper magnetic head is subjected to a force which pushes it to the lower magnetic head and is greater than the force which is normally exerted on the upper magnetic head to push it toward the lower magnetic head so that the track pitch between the upper and lower heads can be varied from that of normal reading and reproducing operations. Moreover, if the pressure applied to the magnetic head is varied in the course of time due to variation in rotational friction of the fulcrum of the arm, it can result in variation of the track pitch between the upper and lower heads. Particularly if the fulcrum of the arm is located above the upper magnetic head with a view to avoid interference between the arm and a case of the magnetic disc at the time of loading the magnetic disc, there can occur a large positional deviation of the upper magnetic head in the radial direction of the magnetic disc in response to the rotation of the arm and consequently the above mentioned deviation of the track of the upper magnetic head can become significant even when the swinging displacement of the arm is very small.

Therefore, it is an object of the present invention to provide a magnetic head assembly which is free from any variation of track pitch between the upper and lower magnetic heads during assembling and normal recording and reading operations.

SUMMARY OF THE INVENTION

The above described problems of the prior art are solved and the above object and other objects of the present invention are achieved by providing a magnetic head assembly, wherein an arm for supporting an upper magnetic head is connected to a magnetic head carriage for supporting a lower magnetic head by way of a fulcrum of the arm so that said arm and the upper magnetic head fitted thereto can be swingably displaced to move toward or away from said lower magnetic head and said arm is provided with a biasing means to bias said upper magnetic head toward said lower magnetic head and a stopper means to define the position of the upper magnetic head nearest to the lower magnetic head.

With such an arrangement as described above, the upper magnetic head is secured against any undesired downward displacement from the defined lowest position due to a force applied to the movable arm and the upper magnetic head upper magnetic head attached thereto by means of a stopper. Therefore, if the position of the upper magnetic head closest to the lower magnetic head is accurately defined, any displacement of the upper magnetic head relative to the lower magnetic head after adjustment of the track pitch and/or during normal operation of the assembly is completely eliminated.

Now the invention will be described by referring to the accompanying drawings that illustrate a preferred embodiment of the invention.

DETAILED DESCRIPTION OF THE INVENTION

Figure 1:
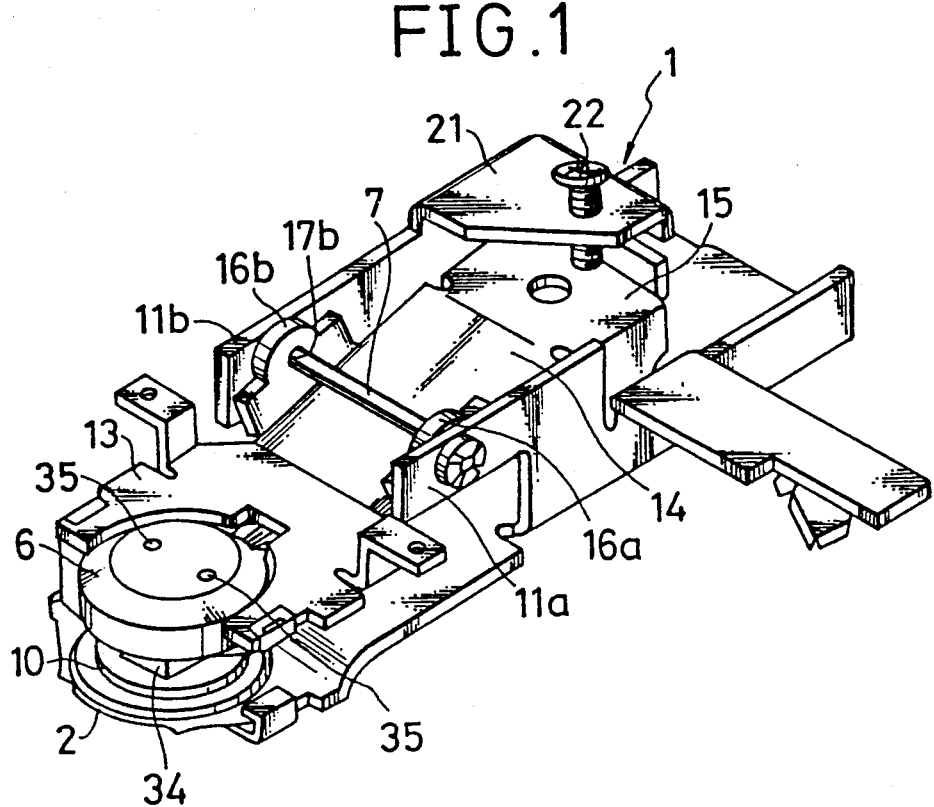
FIG. 1 is a perspective view of a magnetic disc drive apparatus using a magnetic head assembly according to the invention.
Figure 2:
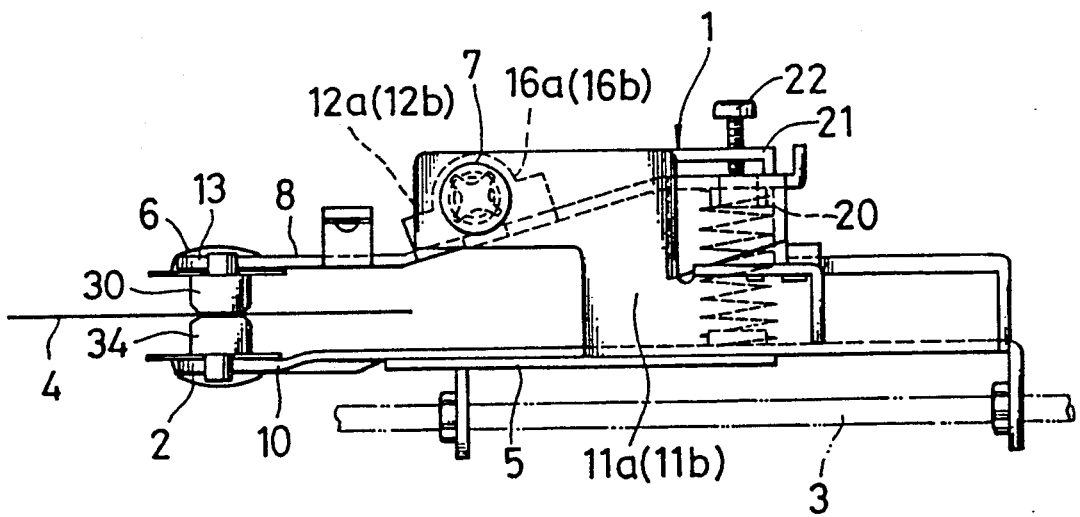
FIG. 2 is a lateral view of the magnetic disc drive apparatus of FIG. 1.

Referring to FIGS. 1 and 2, reference numeral 1 denotes a magnetic head assembly, said magnetic head assembly 1 being provided with a lower magnetic head unit 2 and a carriage 5 that can be linearly moved along a guide shaft 3 in the radial direction of the magnetic disc 4, said carriage 5 being provided with upper magnetic head unit 6 and an arm 8 which is supported by a swing shaft 7 being swingably supported relative to the carriage 5.

Said carriage 5 is realized in the form of a thin plate made of an aluminum alloy and comprises a fitting member 10 realized by forming an opening at the front end thereof for fitting lower magnetic head unit 2 thereto. Reference numeral 9 denotes a substrate of the assembly having arm fitting plate members 11a, 11b which are formed by folding up the two lateral end portions of the substrate. Shaft bearing bores 12a, 12b are respectively provided on the arm fitting plate members 11a, 11b for bearing the swing shaft 7.

On the other hand, the arm 8 comprises a fitting member 13 at its front end for the upper magnetic head unit 6 realized by forming an opening similar to the fitting member 10 of said carriage 5, an upwardly inclined portion 14 at its center and a horizontal portion 15 whose level is higher than that of said fitting member 13 nearer to its base. The inclined portion 14 comprises plate members for fitting 16a, 16b which are formed by folding up its corresponding areas and said plate members for fitting 16a, 16b are also provided respectively with shaft bearing bores 17a, 17b for bearing swing shaft 7. It should be noted that the shaft bearing bores 17a, 17b are located near the center of gravity of the arm 8. The swing shaft 7 is passed through the shaft bearing bores 12a, 12b provided on the arm fitting plate members 11a, 11b by way of the shaft bearing bores 17a, 17b so that the arm 8 is swingably supported by the carriage 5.

A coil spring 20 is resiliently positioned between the horizontal portion 15 of the arm 8 and the carriage 5 and the arm 8 is biased in the direction where the upper magnetic head unit 6 is pushed toward lower magnetic head unit 2. Thus, a predetermined pressure is always applied to the upper magnetic head unit 6 and the lower magnetic head unit 2 by the coil spring 20. Besides, a horizontal plate member 21 is connected to the arm fitting plate members 11b of arm 8 at its upper area and a rod screw 22 for the stopper is screwed into said horizontal area 21. The rod screw 22 comes to abut the arm 8 at a position which is directly opposite to the coil spring 20 so that the lowest position of the upper magnetic head unit 6 on the arm 8 is defined by said coil spring 20. Moreover, the lowest position of the upper magnetic head unit 6 can be redefined by appropriately rotating said rod screw 22.

Figure 3:
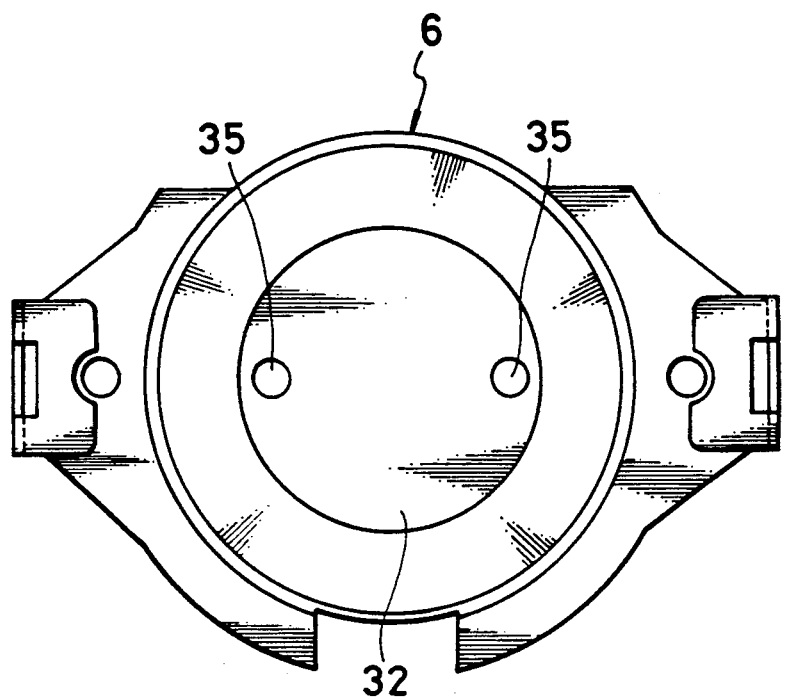
FIG. 3 is a plan view of an upper magnetic head unit.
Figure 4:
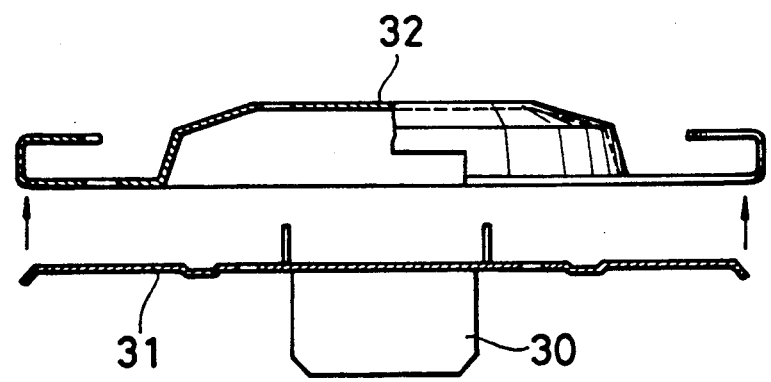
FIG. 4 is a sectional side view of the upper magnetic head unit of FIG. 3.
Figure 5:
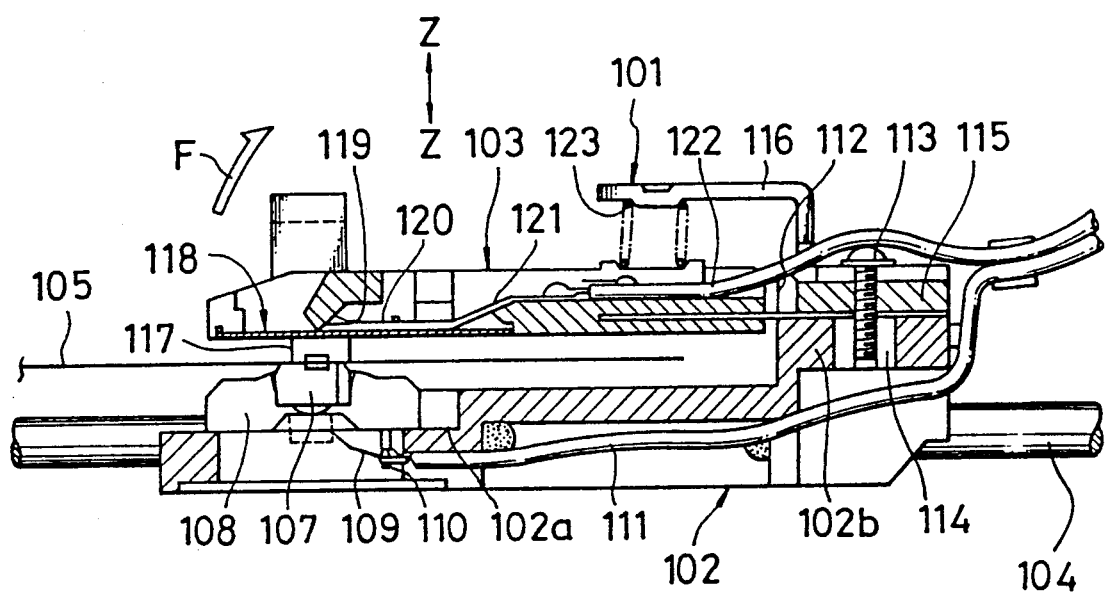
FIG. 5 is a sectional side view of a magnetic disc drive apparatus of the prior art.

As illustrated in FIGS. 3 and 4, said upper magnetic head unit 6 comprises a magnetic head 30 which consists of a head slider comprising a read/write core having a read/write gap and said magnetic head 30 is bonded to a flat spring plate located at the center of a circular gimbals spring 31, while the circular peripheral area of said gimbals spring 31 is welded to a semi-spherical main body 32 of the head by laser beam welding or some other appropriate technique. The main body 32 carries alignment recesses 35, 35 for engagedly receiving an alignment rod for aligning a magnetic head 34 of the lower magnetic head unit 2 having a configuration similar to that of the upper magnetic head unit 6.

The embodiment having a configuration as described above is basically not different from any magnetic head assembly of the prior art in terms of function. More specifically, when a magnetic disc is not loaded, the inclined portion 14 of the arm 8 is held horizontal. On the other hand, when a magnetic disc 4 is loaded, said disc is held at its both ends by the magnetic heads 30, 34 so that it is ready for data recording or reading.

To assembly the magnetic head assembly 1, the carriage 5 is bonded to the arm 8 and the shaft bearing bores 12a, 12b of the arm fitting plate members 11a, 11b of the carriage 8 and the shaft bearing bores 17a, 17b of the plate members for fitting 16a, 16b of the arm 8 are aligned so that the swinging shaft 7 can run through all the bores. At the same time, the coil spring 20 is loaded between the carriage 5 and the arm 8. Thereafter, the lower magnetic head unit 2 is mounted to the fitting member 10 of the carriage 5, while the upper magnetic head unit 6 is mounted to the fitting member 13 of the arm 8, At this stage, while the lower magnetic head unit 2 may be rigidly fitted to the carriage 5, the upper magnetic head unit 6 should be loosely fitted to the arm 8.

Then, the rod screw 22 is screwed until its tip gets to the read/write position sc, that a correct gap is realized for a magnetic head 2 to be loaded between the magnetic head 30 of the upper magnetic head unit 6 and the magnetic head 34 of the lower magnetic head unit 2.

Under this condition, the alignment rod is placed in the alignment recess 35 provided on the upper magnetic head unit 6 to adjust the track pitch of the magnetic head 30 of the upper magnetic head unit 6. Then, the magnetic head 30 is precisely positioned so that a distance equal to the width of four (4) or eight (8) tracks is accurately provided between itself and the magnetic head 34 of the lower magnetic head unit 2 in the radial direction of the magnetic disc 4. Although the upper magnetic head unit 6 is subjected to a force directed to the lower magnetic head unit 2 and exerted by the alignment rod during this positioning operation, the upper and lower magnetic heads 30 and 34 are free from any variation of the track pitch due to undesired movement of the upper magnetic head unit 6 after the positioning operation because any further vertical movement of the upper magnetic head unit 6 is prohibited by the rod screw 22.

After the correct adjustment of the track pitch between the upper and lower magnetic heads 30, 34, the force of rotational friction of the swinging shaft 7 may vary with time if the magnetic disc drive apparatus is run for a long time. However, even if such a condition arises, the track pitch can not be varied by the pressure of the upper magnetic head 30 because the lowest position of the upper magnetic head unit 6 is strictly defined by the rod screw 22.

Effects of the Invention

As is apparent from the above description, in a magnetic head assembly according to the invention, the upper head device is biased toward the lower head device by a bias means while the lowest position of the upper head device where it comes closest to the lower head device is strictly defined by the stopper means so that a correct gap is realized between the two head devices. Consequently, even if the upper head devices is subjected to adjustment operations for the track pitch while it is under pressure, the upper head device is completely free from any displacement after the adjustment operations and variations of the track pitch due to variations of the pressure applied to the magnetic disc by the upper head device. As is apparent from the above description, in a magnetic head assembly according to the invention, the upper head device is biased toward the lower head device by a bias means while the lowest position of the upper head device where it comes closest to the lower head device is strictly defined by the stopper means so that a correct gap is realized between the two head devices. Consequently, even if the upper head devices is subjected to adjustment operations for the track pitch while it is under pressure, the upper head device is completely free from any displacement after the adjustment operations and variations of the track pitch due to variations of the pressure applied to the magnetic disc by the upper head device.

What is claimed is:

1. A magnetic head assembly comprising:
    a lower head device;
    a carriage to which said lower head device is mounted;
    a upper head device;
    an arm to which said upper head device is mounted, said arm having a first end with said upper head device mounted proximate said first end, a second end, and a pivot point, wherein said pivot point is located along said arm intermediate said first end and said second end, wherein said carriage is connected with said arm at said pivot point such that a data recording disc is held by the head devices and data recording and reading operations are conducted by moving said carriage in a radial direction of the disc, wherein said arm and the upper head device mounted thereto can be swingably displaced about said pivot point relative to said lower head device to move the upper head device toward or away from said lower magnetic head;
    a biasing means operatively coupled between said carriage and said arm for urging said upper magnetic head toward said lower magnetic head; and
    a stopper means operatively coupled to said carriage for defining and for selectively changing the position of the upper magnetic head when the arm is at a limit of its swing nearest to the lower magnetic head, said stopper means being disposed so as to contact said arm at a location on said arm on a second end side of said pivot point.

2. A magnetic head assembly comprising:
    an upper magnetic head;
    arm means having a first end and a second end which are rockable about a pivot axis located intermediate said first and second ends said arm means provide support for said upper magnetic head at said first end of said arm means;

a lower magnetic head;

base means for supporting said lower magnetic head and for supporting said arm means about said pivot axis such that the said upper magnetic head is disposed opposite said lower magnetic head when said first end of said arm means is rocked toward said lower magnetic head; and adjusting means for setting and for selectively changing a minimum clearance between said upper magnetic head and said lower magnetic head when said arm means is rocked toward said lower magnetic head, wherein said adjusting means is disposed to come into contact with said second end of said arm when said upper and said lower magnetic heads are disposed at said minimum clearance, and wherein said adjusting means is operatively coupled with said base means.

3. An assembly as in claim 2, further comprising a biasing means operatively coupled to said arm means for urging said upper magnetic head toward said lower magnetic head.

4. An assembly as in claim 3, wherein said said biasing means is disposed between said second end of said arm means and said base means.

5. An assembly as in claim 2, wherein said adjusting means is fixedly connected to said base means.

6. An assembly as in claim 2, wherein said upper and said lower magnetic heads hold a data recording disc between the heads when said heads are disposed such that the heads have said minimum clearance between them, wherein data recording and reading operations are conducted by moving said base means in a radial direction of the disc, wherein said first end of said arm means and said upper magnetic head can be swingingly displaced relative to said lower magnetic head to move the upper head magnetic head toward or away from said lower magnetic head.

7. An assembly as in claim 2, wherein said adjusting means comprises a threaded rod which as it is threaded into and out of a support hole changes and minimum clearance.

8. A magnetic head assembly comprising:

an upper magnetic head device having an at least one upper alignment recess;

arm means having a first end and a second end which are rockable about a pivot axis located intermediate said first and second ends, said arm means providing support for said upper magnetic head device at said first end of said arm means;

a lower magnetic head device having an at least one lower alignment recess;

base means for supporting said lower magnetic head device and for supporting said arm means about said pivot axis such that the said upper magnetic head device is disposed opposite said lower magnetic head device when said first end of said arm means is rocked toward said lower magnetic head device; and adjusting means for setting and for selectively changing a minimum clearance between said upper magnetic head device and said lower magnetic head device when said arm means is rocked toward said lower magnetic head, wherein said adjusting means is disposed to come into contact with said second end of said arm when said upper and said lower magnetic heads are disposed at said minimum clearance, and wherein said adjusting means is operatively coupled with said base means, wherein said minimum clearance between said devices is maintained after an alignment operation wherein an alignment tool uses at least one upper alignment recess and one lower alignment recess to align said head devices.

* * * * *